UNITED STATES PATENT OFFICE.

JOHN W. KIDWELL, OF GEORGETOWN, DISTRICT OF COLUMBIA.

IMPROVEMENT IN TREATING COPPER ORES.

Specification forming part of Letters Patent No. 153,573, dated July 28, 1874; application filed July 24, 1874.

*To all whom it may concern:*

Be it known that I, JOHN W. KIDWELL, of the city of Georgetown, in the District of Columbia, have invented certain new and useful Improvements in Treating Copper Ores, &c.; and I do hereby declare the following to be a full, clear, and exact description of the invention, such as will enable others skilled in the art to which it pertains to make and use it.

This invention consists in certain modifications and improvements in the process of treating ores of copper and iron, and in obtaining useful products therefrom, described in the specification of Patent No. 74,791, issued to Gustav Bischof, Jr., and dated February 25, 1868. In said patent is described apparatus for the production of iron sponge, and the use of it in separating copper and other metals from their solutions.

This improvement relates especially to the use of mixed ores of iron and copper, and by it the iron obtained from the copper ore itself is used in separating the copper and producing either fine copper or in concentrating the copper and other metals more valuable, which are sometimes found mixed with copper ores, so as to be transported to large and well-equipped metallurgic establishments, in which the operations of separating and refining the several metals may be economically conducted.

There are large masses of ores in different parts of this and other countries which contain iron, copper, gold, silver, and other metals, but in so dispersed a state that their bulk and weight prevents their transportation to properly - organized metallurgic establishments. By my invention the several metals are easily collected near the spots where mined, and concentrated, so as to be transported even long distances at such cost that the work will prove profitable.

The following is my method of treating ores of iron, copper, and other metals: The ores to be treated must be pulverized by dry or wet process. Ores containing copper, or copper and iron, as oxides or carbonates, or any combination which, by simply roasting or annealing with charcoal-powder, can be reduced to the metallic state, do not require any further preparation after being pulverized. Ores containing copper and iron as native oxides or carbonates, or oxides formed by roasting from sulphurets, after being pulverized, are mixed with from ten to twenty per cent. of charcoal-powder, coke, coal, or other carbonaceous material, and then, atmospheric air being excluded, exposed to a light-red heat until the ores are reduced to the metallic state, usually taking from six to eight hours. This operation can be performed in a Bischof oven, such as described in his patent named above, or any other suitable oven. Reduction of the oxides of iron and copper having been effected, the reduced metals, before cooling, are drawn into water, or into an air-tight vessel, as used by Bischof. This must be done to prevent the reoxidation of the fine grains of metallic copper and iron which have been formed by annealing the ore with the charcoal-powder, coke, or other carbonaceous material. If the proper heat has been applied, the pulp, after being drawn out of the furnace and cooler, consists of a fine powder, in which metallic copper and iron appear in fine separate grains. This is explained by the fact that the oxide of copper is reduced first and the oxide of iron at a later period, after a longer and stronger heat, but both oxides before their melting-point. Oxides of various kinds will vary in this respect, magnetic iron requiring decidedly a higher degree of heat for reduction than common red oxide. This copper and iron powder, or reduced copper ore containing metallic copper and iron in fine grains, is thrown into the casks used by Bischof in patent dated February 25, 1868, and the solution of sulphate of copper added.

The particular economy of this precipitation can be seen from the fact that I gain the copper contained in the solution and the copper contained in the reduced copper ore at the same time. The resulting cement copper is then washed, pressed into cakes, dried, and melted.

In locations where it is expensive to use the precipitation on account of not having acid to dissolve the copper ores, I use the following process: I add to the ore only charcoal-powder, coke, coal, or other carbonaceous material sufficient to reduce the oxide of copper to the metallic state, regulating the heat so that the oxide of copper only will be reduced to the metallic state and the iron remain in the state of an oxide. I then use a shaking table, or some approved concentrator, for separating the metallic copper from the oxide of iron.

When the copper ores contain too small a proportion of iron for use in precipitation and contain gold or silver, or both, I proceed as follows: After reducing the ores to the metaltic state by the process hereinbefore described, I dissolve the iron and other metals with dilute sulphuric acid, leaving copper, gold, and silver in the metallic state.

In localities where the precipitation of copper from the solution of sulphate of copper is too expensive, or where the ores contain metals which would cause the cement copper to be of poor quality, (such as lead, antimony, &c.,) I crystallize the sulphate of copper from the solution and calcine this sulphate, thereby producing oxide of copper. This oxide of copper I then reduce to the metallic state by treating it with charcoal, coke, coal, or other carbonaceous material, in the Bischof or any other suitable furnace, in the manner before stated.

As most of the copper and iron sponge prepared by the above process contains more or less gangue, I use a shaking table, or some approved concentrator, to separate the iron and copper from the impurities. By this means a large percentage is added to the purity of the precipitated copper.

The solutions of copper to be used in carrying out this process I prepare by any of the methods suitable for that purpose. Such being well known, need not be described here.

Having thus described my invention, what I claim, and desire to secure by Letters Patent, is—

1. The process above described for working mixed ores of iron and copper, consisting in roasting the ores, so as to produce oxides, and thus reducing the oxides to a metallic state by carbonaceous material in a closed oven, so as to prepare a precipitating material for separating copper and other metals from their solutions, substantially as described.

2. The application of the mixed sponges of iron and copper for precipitating and collecting metals from solutions, as described.

3. The process of producing copper sponge, or metallic copper, by reducing oxide of copper (produced by calcining the sulphate of copper) with charcoal, coke, coal, or other carbonaceous material, in a Bischof or other airtight oven, substantially as described.

4. The process of separating copper from mixed ores of iron and copper by heating these ores in the Bischof or other closed furnace with a limited supply of charcoal, coke, coal, or other carbonaceous material, so as to reduce only the copper, and then separating the metallic copper by means of a shaking table or other separator, substantially as described.

JOHN W. KIDWELL.

Witnesses:
JNO. S. KIDWELL,
THEO. F. GATCHELL.